Aug. 13, 1935.                R. P. SHERMAN                 2,011,087
                    LUBRICATING DEVICE FOR VALVE STEMS
                          Filed Sept. 3, 1932
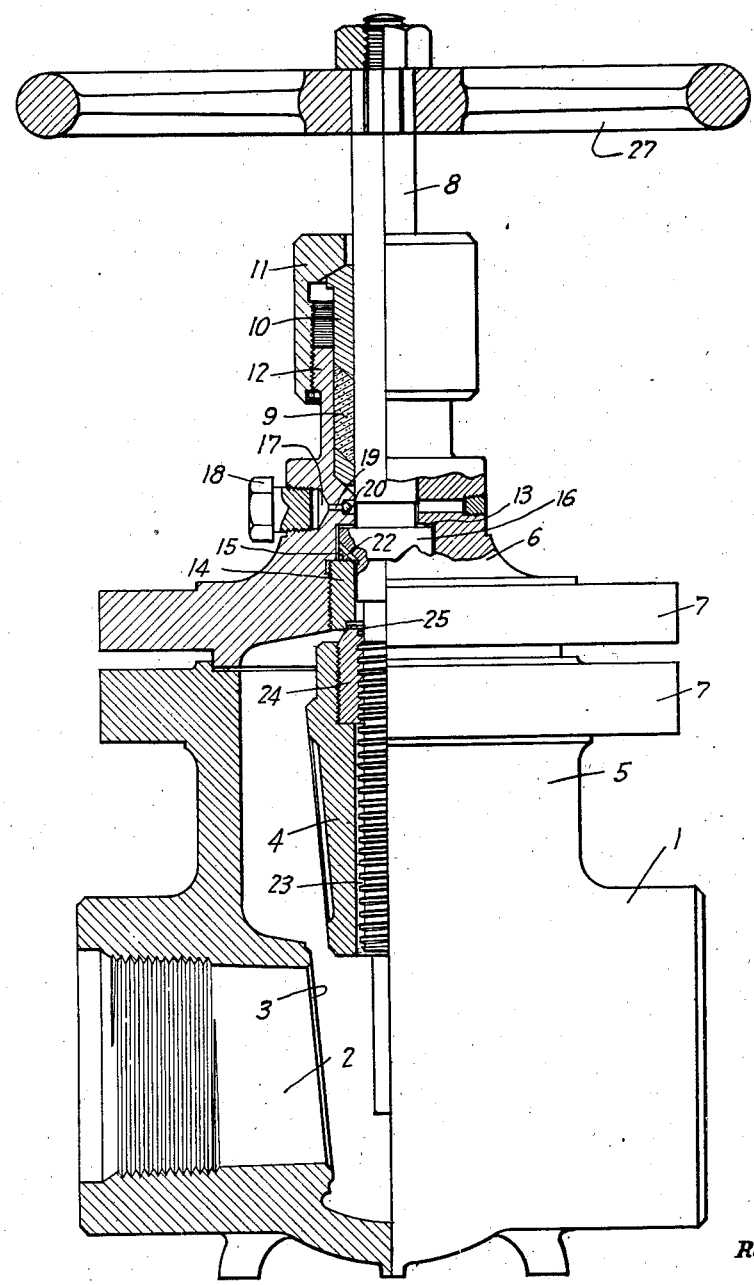
Ralph P. Sherman
INVENTOR
BY Jesse R. Stone
ATTORNEY Patented Aug. 13, 1935

2,011,087

UNITED STATES PATENT OFFICE 2,011,087

LUBRICATING DEVICE FOR VALVE STEMS

Ralph P. Sherman, Houston, Tex., assignor to Hughes Tool Company, Houston, Tex., a corporation of Texas Application September 3, 1932, Serial No. 631,662

2 Claims. (Cl. 251—62)

My invention relates to valves, particularly gate valves, and pertains to the means for lubrication thereof.

In large valves such as gate valves, one of the persistent difficulties in the operation thereof is in the matter of lubrication. The threaded connection of the gate with the valve stem is inaccessible and is liable to become stuck or "frozen" so as to make the operation of the valve extremely difficult. This can only be avoided by effective lubrication of the threaded connection. But where a lubrication channel is formed in the stem itself, it is found that the stem is greatly weakened and is hence liable to break under strain.

I aim to lubricate the threads through a force feed of lubricant around the stem to the valve.

I have as an object to lubricate the valve by opening the same and wedging the valve itself into the valve stem support and then forcing lubricant about the threads.

I desire to lubricate the valve without weakening the valve structure or the valve stem and still assure a forcible lubrication of the normally inaccessible portions of the valve.

In the drawing herewith I have shown a side view partly in section and partly in side elevation of a gate valve embodying the invention.

The valve is of the usual gate valve type. It has a body 1 with a fluid passage therethrough at 2. Centrally of the passage is a transverse seat 3 for the valve 4. The body has a bonnet 5 with a removable cap 6 screwed thereto by bolts—not shown—through the mating flanges 7.

The cap 6 is formed into a guide for the valve stem 8 and has a stuffing box at its outer end formed to receive packing 9 having thereon a gland 10 adapted to be tightened in position by a cap 11 screwed over the outer end 12 of the cap.

Below the stuffing box is a chamber 13 which is increased in diameter toward the lower end of the cap to receive a tubular nut 14, the upper end of which forms a shoulder 15 acting as a lower thrust bearing for the radial flange 16 upon the valve stem 8.

Between the chamber 13 and the stuffing box the wall of the cap is formed with an outer radial recess 17, threaded to connect with a grease gun and normally closed by a threaded plug 18. This recess has a passage 19 connected therewith to allow the flow of lubricant to the chamber 13. A valve 20 in said passage prevents the flow of lubricant back into said recess.

The valve stem 8 is reduced in diameter slightly above the flange 16 to provide clearance for lubricant to the chamber 13. The said flange has clearance in the chamber and a small duct 22 is formed diagonally across the flange leading from the outer side thereof to the lower side closely adjacent the stem so as to allow passage of lubricant past the seal which may be formed between the said flange and the shoulder 15 when the valve is opened.

The lower end of the stem is threaded for engagement with the gate valve member 4. Said gate is wedge shaped and has a central axial opening 23 to receive the stem. At the upper end of the opening a nut 24 is secured. Said nut has a coarse thread on its inner surface to engage with the valve stem. The upper end of the nut 24 is tapered upwardly to engage within a seat 25 formed in the lower end of the nut or ring 14.

Thus when the valve stem is rotated by means of the handle 27 to screw the valve 4 to open position, the nut 24 will seat in the recess 25 and form a seal at that point. Lubricant may then be forced into the recess 17 by means of a grease gun, or otherwise, and said lubricant can pass through the chamber 13, the duct 22 and within the nut 14 to the upper end of the nut 24 and down about the threads of the valve stem. Pressure can be exerted on the lubricant to force it copiously about the threaded connection between the valve and the valve stem and assure full lubrication. The valve may then again be moved to closed position.

By forcing the lubricant down around the stem instead of having to tap the stem itself as is sometimes done, the stem is not weakened and better lubrication results. The structure is simpler, cheaper to make and stronger.

What I claim as new is:

1. A gate valve including a body, a valve therein, a valve stem having a threaded connection with said valve, a cap on said body about said stem, a flange on said stem, a seat in said cap about the stem, a tapered upper end on said valve adapted to fit said seat when said valve is moved thereto, a lubricating recess in said cap communicating with said stem, and a passage provided about said stem and through said flange connecting said recess with said seat and said valve, whereby, when said valve is seated on said cap, lubricant can be forced into said threaded connection.

2. A gate valve including a body, a valve therein, a valve stem having a threaded connection with said valve, a cap on said body about said stem, a flange on said stem, a seat in said cap about the stem, a tapered upper end on said valve adapted to fit said seat when said valve is moved thereto, a lubricating recess in said cap communicating with said stem, said flange having a lubricant duct therethrough whereby lubricant can be forced from said recess about said stem to said seat and said valve.

RALPH P. SHERMAN.